UNITED STATES PATENT OFFICE.

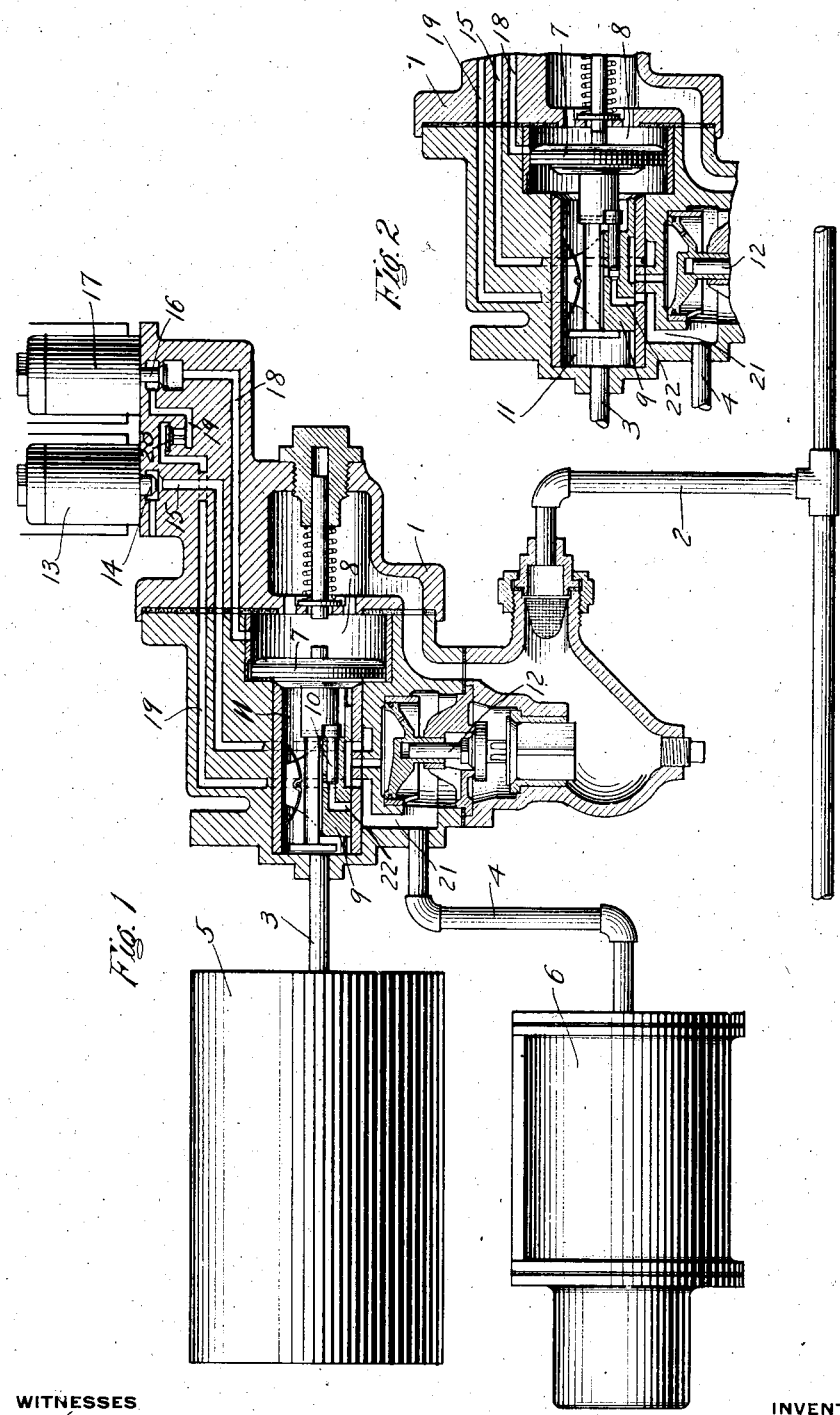

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,107,381.     Specification of Letters Patent.    Patented Aug. 18, 1914.

Application filed November 25, 1913. Serial No. 802,916.

*To all whom it may concern:*

Be it known that I, WALTER V. TURNER, a citizen of the United States, residing at Edgewood, in the county of Allegheny and State of Pennsylvania, have invented new and useful Improvements in Electropneumatic Brakes, of which the following is a specification.

This invention relates to fluid pressure brakes, and more particularly to a brake adapted to be controlled either electrically or pneumatically.

It has heretofore been proposed to employ an electro-pneumatic brake in which the brakes may be applied by effecting a reduction in brake pipe pressure, either directly, or by means of an electrically controlled device. As well known, if the rate of reduction in brake pipe pressure exceeds a certain degree the piston of the triple or equalizing valve device will be shifted to emergency position, causing an emergency application of the brakes, and if the triple valve is of the quick action type, a local venting of fluid from the brake pipe will be effected, which causes quick serial action throughout the train in the usual well known manner. When the electrically controlled device is operated to effect a reduction in brake pipe pressure at the triple valve, there may be an existing leakage from the brake pipe and if this leakage added to the reduction caused by the operation of the electrically controlled device is sufficient to produce a rate of reduction in brake pipe pressure exceeding the service rate of reduction, it is evident that the triple valve parts will be shifted to emergency position, causing an undesired emergency application of the brakes.

The principal object of my invention is to provide means for obviating the above difficulty.

In the accompanying drawing; Figure 1 is a view of an electro-pneumatic brake equipment, showing the electro-pneumatic brake controlling valve mechanism in section, with the parts in normal release position; and Fig. 2 a sectional view of the equalizing portion of the electro-pneumatic brake controlling valve mechanism, showing the parts in service application position.

As shown in the drawing, a triple valve device 1 of the usual quick action type may be provided having brake pipe 2 connected thereto and connected by the respective pipes 3 and 4 to the auxiliary reservoir 5 and the brake cylinder 6. The triple valve device comprises the usual piston 7 contained in piston chamber 8 communicating with brake pipe 2 and main slide valve 9 carrying the graduating valve 10 and contained in valve chamber 11 open to the auxiliary reservoir 5. The triple valve device also has a quick action valve mechanism 12 of the usual type for effecting a local reduction in brake pipe pressure.

For controlling the brakes electrically a release magnet 13 adapted to operate a release valve 14 may be provided, the release valve 14 controlling the brake cylinder exhaust passage 15.

An electric service valve 16 operated by magnet 17 controls the venting of fluid from the brake pipe 2 through passage 18 to passage 19 containing a check valve 20 and leading to the brake cylinder passage 21.

The electric service passage 18 opens into piston chamber 8 and is located so that when the usual service port 22 in the main slide valve of the triple valve device is partly open, the inner edge of the port opening of said passage is about line and line with the outer edge of the usual piston ring of the triple valve piston 7, as shown in Fig. 2 of the drawing. It will now be seen that by this arrangement of ports, any movement of the triple valve parts tending to increase the opening of the service port 22 will at the same time tend to restrict the opening of the electric vent port 18.

In operation, if the service magnet 17 is energized to effect an electric service application of the brakes, the valve 16 is opened and fluid under pressure is vented from the piston chamber 8 and the brake pipe 2 to the brake cylinder, the passage being of such size as to limit the rate of flow to the desired service rate. The triple valve piston is thus shifted to service position, opening the service port, 22, so that fluid is supplied from the auxiliary reservoir to the brake cylinder in the usual manner. If, however, there should happen to be a brake pipe leak of any consequence, the reduction in brake pipe pressure so effected added to the reduction caused by the opening of the electric service valve might be sufficient to move the triple valve piston 7 outwardly toward emergency position. Should this occur, the movement of the piston 7 automatically restricts and finally closes the electric service port 18, while at the same time the opening of the usual triple valve service port 22 is increased. It will thus be seen that the tendency to move out beyond service position is checked both by the restriction or complete closure of the port 18 which cuts off the venting of fluid from the brake pipe by action of the electric service valve and by the increased rate of reduction in auxiliary reservoir pressure produced by the enlargement of the opening of the triple valve service port 22.

It will now be clear that my improvement prevents the movement of the triple valve parts beyond service position in making an electric service application of the brakes by automatically closing the electric service brake pipe vent port.

Having now described my invention, what I claim as new and desire to secure by Letters Patent, is:—

1. In a fluid pressure brake, the combination with a brake pipe and an equalizing valve device operated upon a reduction in brake pipe pressure for effecting an application of the brakes, of electrically controlled means for venting fluid from the brake pipe having a vent port adapted to be gradually restricted by the movement of the equalizing valve device to gradually open the usual service port.

2. In a fluid pressure brake, the combination with a brake pipe and an equalizing valve device comprising valve means for controlling a brake cylinder service port and a piston operated upon a reduction in brake pipe pressure for actuating said valve means, of an electrically controlled valve device adapted to vent fluid from the brake pipe through a passage controlled by said piston to effect a service reduction in brake pipe pressure, the port opening of said passage to the brake pipe being gradually reduced in area as the brake cylinder service port opening is gradually increased in area.

3. In a fluid pressure brake, the combination with a brake pipe and an equalizing valve device operated upon a reduction in brake pipe pressure for effecting an application of the brakes, of electrically controlled means for venting fluid from the brake pipe to effect a service reduction in brake pipe pressure and having a vent port opening into the piston chamber of the equalizing piston and adapted to be controlled by the piston ring of said piston.

4. In a fluid pressure brake, the combination with a brake pipe and an equalizing valve device having a piston operating upon a gradual reduction in brake pipe pressure to make a partial traverse and effect a service application of the brakes, of electrically controlled means for venting fluid from the brake pipe through a port controlled by said piston, said port being adapted to be closed upon a further traverse beyond service position.

5. The combination with a triple valve device and a brake pipe communicating with the piston chamber thereof, of an electric service valve device for controlling a brake pipe vent port opening into said piston chamber at a point intermediate the extreme positions of the triple valve piston.

In testimony whereof I have hereunto set my hand.

WALTER V. TURNER.

Witnesses:
A. M. CLEMENTS,
HOWARD J. BRUSH.